Jan. 2, 1951  A. T. SCHEIWER  2,536,702
COUPLING
Filed Sept. 23, 1947

INVENTOR.

BY *Albert T. Scheiwer*

ATTORNEY.

Patented Jan. 2, 1951

2,536,702

UNITED STATES PATENT OFFICE 2,536,702

COUPLING

Albert T. Scheiwer, Erie, Pa.

Application September 23, 1947, Serial No. 775,599

6 Claims. (Cl. 284—19)

This invention relates generally to couplings and more particularly to snap-type couplings.

No means has heretofore been provided to vary the pressure on locking ball members in a ball-type coupling.

It is, accordingly an object of my invention to overcome the above and other defects in snap-type couplings and it is more particularly an object of my invention to provide a snap-type coupling which is simple in construction, positive in operation, economical in cost, economical in manufacture, and efficient in operation.

Another object of my invention is to provide simple means for adjusting the pressure on the ball members of a ball-type coupling.

Another object of my invention is to provide a ball-type coupling wherein the male member may be inserted into the female member and automatically locked therein without manual intervention.

Figure 1:
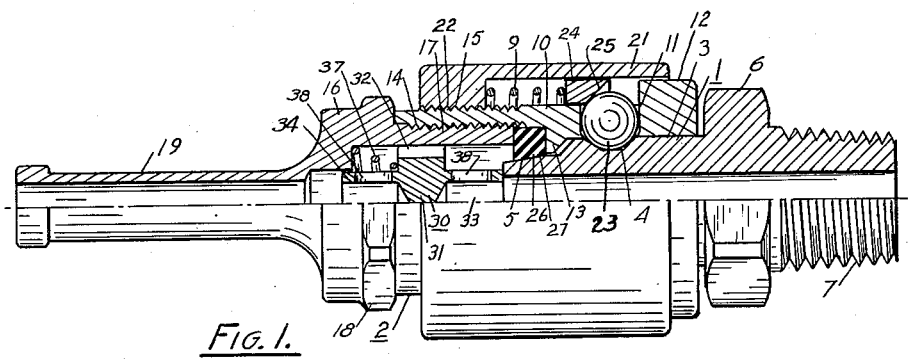

Other objects of my invention will become evident from the following detailed description taken in conjunction with the accompanying drawings, in which Fig. 1 is a side elevational view partly in section of my novel ball-type coupling in locked position.

Figure 2:
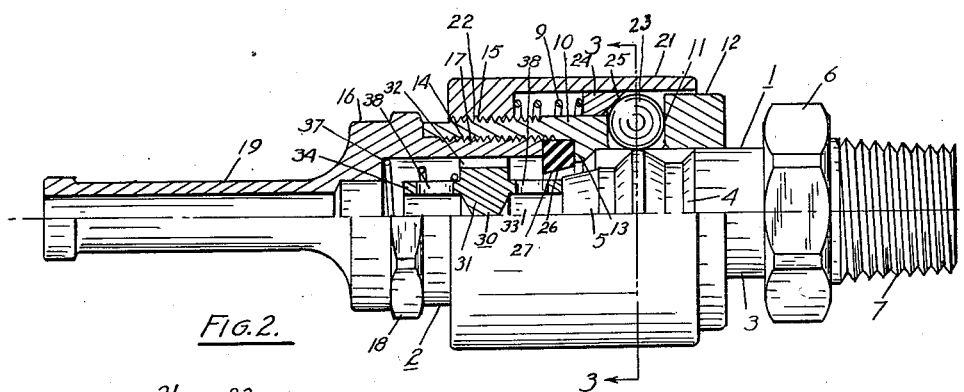
Figure 3:
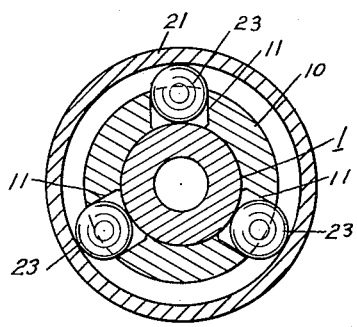

Fig. 2 is a side elevational view partly in section of my novel ball-type coupling with the male member partially removed; and Fig. 3 is a view taken on the line 3—3 of Fig. 2.

Referring now to the drawings, Figs. 1, 2, and 3 show a male member 1 and a female member 2. The male member 1 comprises a connecting portion 3 with a peripheral groove 4, a reduced tapered end portion 5, a shoulder 6 with an outer polyhedral surface for engagement of a wrench, and a threaded portion 7 for threaded engagement with a hose connection or the like (not shown).

The female member 2 comprises a shell or sleeve member 10 having radially extending ball retaining apertures 11, a shoulder 12, an internal shoulder 13, and inner and outer threaded portions 14 and 15; a connecting member 16 having a threaded portion 17 engaging the inner threaded portion 14 of the sleeve member 10, a wrench-engaging shoulder 18, and a hose connecting portion 19; and an outer generally L-shaped sleeve 21 having an inner threaded portion 22 for threaded engagement with the outer threaded portion 15 on the shell member 10. Ball members 23 are disposed in the ball retaining apertures 11 in the sleeve 10 for engagement with the groove 4 in the connecting portion 3 of the male member 1. A camming member 24 with a tapered cam surface 25 is urged by the spring 9 against the ball members 23 to urge them into engagement with the groove 4 on the connecting portion 3 of the male member 1 as shown in Fig. 1. A washer 26 is disposed between the inner shoulder 13 of the shell member 10 and the end of the connecting member 16 and has a tapered inner surface 27 for sealing engagement with the tapered end portion 5 of the male member 1.

A check valve 30 is disposed for longitudinal movement in the connecting member 16 and comprises a centrally disposed shoulder 31 with radially extending fin members 32, and longitudinally extending tubular portions 33 and 34 having apertures 38. The end portion 5 of the male member 1 engages the tubular portion 33 to move the check valve 30 longitudinally against the force of the spring 37 when the male and female members 1 and 2 are engaged as in Fig. 1 to permit the flow of fluid through the apertures 38 in the tubular members 33 and 34 and through the open spaces between the radially extending fin members 32. When the male and female members 1 and 2 are disengaged, the spring 37 forces the shoulder 31 of the check valve 30 against the washer 26 to stop the flow of fluid from the female member 2.

In operation, the outer sleeve 21 is rotated until the desired pressure of the spring 9 against the ring 24 is obtained. The pressure of the spring 9 may be varied by rotation of the outer sleeve 21 in either direction. The connecting portion 3 of the male member 1 is then inserted into the female member 2 and the ball members 23 are forced outwardly against the cam portion 25 of the camming ring 24. The ball members 23 are then automatically forced into the groove 4 in the connecting portion 3 of the male member 1 by the spring-urged cam portion 25 of the ring member 24 as shown in Fig. 1 to lock the male and female members 1 and 2 together. The check valve 30 is moved longitudinally against the force of the spring 37 by the end portion 5 of male member 1 to permit the flow of fluid through the male and female members 1 and 2 when they are connected together.

It will be evident from the foregoing that I have provided an efficient ball-type coupling which may be securely coupled by merely inserting the connecting portion of the male member into the female member and in which the pressure on the ball members may be easily and quickly varied.

It should be especially noted that the check valve 30 is so constructed that it may be inserted without observing whether one end or the other is inserted first. This prevents mistakes in assembly and the life of the check valve is doubled by reversing it when one side thereof wears too much.

Various changes may be made in the specific embodiment of my invention without departing from the spirit thereof or from the scope of the appended claims.

What I claim is:

1. A coupling comprising a male member having a connecting portion with a peripheral groove; and a female member comprising an inner sleeve with inner and outer threaded portions, a threaded connecting member engaged with the inner threaded portion of said sleeve, a centrally apertured, cup-shaped threaded outer sleeve for engagement with the outer threaded portion of said inner sleeve, a spring-urged camming ring member disposed between said inner and outer sleeves, and camming members carried by said inner sleeve and engaged by said spring-urged camming member for automatically engaging the groove in the connecting portion of said male member to secure said male and female members together.

2. A coupling as set forth in claim 1 wherein said camming members are ball members.

3. A coupling as set forth in claim 1 wherein a check valve is disposed in said connecting member to seal said female member when said male and female members are disconnected.

4. A coupling comprising a male member having a connecting portion with a peripheral groove; and a female member comprising threadably engaged inner and outer sleeves, a camming ring disposed between said inner and outer sleeve having a tapered cam portion, a spring for urging said camming ring longitudinally, and camming members engaged by the cam portion of said camming ring to force said camming members into engagement with said groove in the connecting portion of said male member to secure said male and female members together said outer sleeve being movable relative to said inner sleeve to adjust the tension of said spring urging said camming ring longitudinally.

5. A coupling as set forth in claim 4 wherein said camming members are ball members.

6. A coupling member comprising a male member having a connecting portion with a groove; and a female member comprising a relatively movable inner and outer sleeve, a spring-urged camming ring disposed between said inner and outer sleeves, and camming members carried by said inner sleeve engaging said camming ring and adapted to engage the groove in the connecting portion of said male member to secure said male and female members together, and means for adjusting the longitudinal relative position of said sleeves to vary the spring pressure of said camming ring.

ALBERT T. SCHEIWER.

REFERENCES CITED

The following references are of record in the file of this patent:

UNITED STATES PATENTS

| Number | Name | Date |
|---|---|---|
| 403,083 | Andrew | May 14, 1889 |
| 1,497,483 | Callender et al. | June 10, 1924 |
| 1,873,814 | Adams | Aug. 23, 1932 |
| 2,010,210 | Witt | Aug. 6, 1935 |
| 2,419,503 | Scheiwer | Apr. 22, 1947 |